United States Patent
Rowe et al.

(10) Patent No.: US 9,363,472 B2
(45) Date of Patent: Jun. 7, 2016

(54) VIDEO INJECTION FOR VIDEO COMMUNICATION

(71) Applicant: SAMSUNG ELECTRONICS CO., LTD., Suwon, Gyeonggi-Do (KR)

(72) Inventors: Jason Rowe, Irvine, CA (US); Daniel Gicklhorn, Bellevue, WA (US); Fabio Gava, Ladera Ranch, CA (US); Ho Suk Chung, Rancho Palos Verdes, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 13/831,094

(22) Filed: Mar. 14, 2013

(65) Prior Publication Data

US 2014/0267578 A1    Sep. 18, 2014

(51) Int. Cl.
| | | |
|---|---|---|
| *H04N 7/14* | (2006.01) | |
| *H04N 7/15* | (2006.01) | |
| *H04N 21/436* | (2011.01) | |
| *H04N 21/4788* | (2011.01) | |
| *H04N 21/647* | (2011.01) | |
| *H04L 12/18* | (2006.01) | |

(52) U.S. Cl.
CPC .............. *H04N 7/15* (2013.01); *H04L 12/1822* (2013.01); *H04N 21/43615* (2013.01); *H04N 21/4788* (2013.01); *H04N 21/64738* (2013.01); *H04M 2250/52* (2013.01)

(58) Field of Classification Search
CPC .......... H04L 12/1822; H04M 2250/52; H04N 21/43615; H04N 21/4788; H04N 21/64738
USPC ................... 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 6,025,871 | A  * | 2/2000 | Kantor et al. .............. | 348/14.07 |
| 6,298,120 | B1 | 10/2001 | Civanlar et al. | |
| 6,732,183 | B1 | 5/2004 | Graham | |
| 7,096,037 | B2 * | 8/2006 | Canova et al. ............. | 455/556.1 |
| 7,362,349 | B2 * | 4/2008 | Nelson et al. .............. | 348/14.08 |
| 8,520,050 | B2 * | 8/2013 | Blackburn et al. ......... | 348/14.01 |
| 2007/0070182 | A1 | 3/2007 | Ryu et al. | |
| 2008/0059580 | A1 | 3/2008 | Kalinowski et al. | |
| 2008/0163312 | A1* | 7/2008 | Faust et al. ....................... | 725/93 |
| 2008/0240094 | A1 * | 10/2008 | Chang ........................... | 370/389 |
| 2009/0013059 | A1 * | 1/2009 | Partaker et al. ............... | 709/217 |
| 2011/0138069 | A1 | 6/2011 | Momchilov et al. | |
| 2011/0145868 | A1 * | 6/2011 | Hultkrantz ..................... | 725/62 |
| 2012/0011210 | A1 * | 1/2012 | Cole et al. ..................... | 709/206 |
| 2012/0131098 | A1 * | 5/2012 | Wood et al. ................... | 709/203 |
| 2012/0148034 | A1 * | 6/2012 | Ferguson ................... | 379/88.14 |
| 2012/0287231 | A1 * | 11/2012 | Ravi et al. .................. | 348/14.12 |
| 2013/0060849 | A1 * | 3/2013 | Zimmet et al. ............... | 709/204 |

* cited by examiner

*Primary Examiner* — Hemant Patel
(74) *Attorney, Agent, or Firm* — Sherman IP LLP; Kenneth L. Sherman; Steven Laut (57) ABSTRACT

A method for video communication comprises initiating video communication on a channel with a first electronic device, communicating first content on the channel with the first electronic device, selecting second content from a source external to the video communication, switching video communication using the second content, and transmitting the second content on the channel to the first electronic device instead of the first content.

25 Claims, 8 Drawing Sheets

FIG. 9

VIDEO INJECTION FOR VIDEO COMMUNICATION

TECHNICAL FIELD

One or more embodiments relate generally to video communication, and in particular, to injecting video content during video communication.

BACKGROUND

Video calls and video chat are mechanisms of transmitting video and audio from a device hosting one camera to another device, and vice-versa. Video call and video chat communication are generally accomplished by establishing a bi-directional or two one-way streaming channels between devices, and encoding video from a camera source for sending along the channel.

SUMMARY

In one embodiment, a method provides for video communication. One embodiment comprises initiating video communication on a channel with a first electronic device. In one embodiment, first content is communicated on the channel with the first electronic device. In one embodiment, second content is selected from a source external to the video communication. In one embodiment, video communication is switched using the second content, and the second content is transmitted on the channel to the first electronic device instead of the first content.

One embodiment provides a system for video communication. In one embodiment an encoder encodes one of first content and second content for providing video communication on a channel with a first electronic device. In one embodiment, a first decoder decodes the first content. In one embodiment, a second decoder decodes the second content. In one embodiment, an interface is used for selecting the second content from a source external to the video communication. In one embodiment, the interface switches video communication to the first electronic device by requesting transmission of the second content on the channel instead of transmission of the first content on the channel.

Another embodiment provides a non-transitory computer-readable medium having instructions which when executed on a computer perform a method comprising: initiating video communication on a channel with a first electronic device. In one embodiment, first content is communicated on the channel with the first electronic device. In one embodiment, second content is selected from a source external to the video communication. In one embodiment, video communication is switched using the second content. In one embodiment, the second content is transmitted on the channel to the first electronic device instead of the first content These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to video communication. One or more embodiments provide video communication (e.g., video call, video chat, etc.) of a second content (e.g., a video stream) replacing that of first content (e.g., video and audio during a video call or video chat session, etc.) in a same channel for communication.

In one embodiment, the electronic devices comprise one or more stationary electronic devices (e.g., television systems, computing systems, etc.) or mobile electronic devices capable of data communication over a communication link such as a wired or wireless communication link. Examples of such mobile device include a mobile phone device, a mobile tablet device, etc. In one embodiment, a method provides for video communication. One embodiment comprises initiating video communication on a channel with a first electronic device. In one embodiment, first content is communicated on the channel with the first electronic device. In one embodiment, second content is selected from a source external to the video communication. In one embodiment, video communication is switched using the second content, and the second content is transmitted on the channel to the first electronic device instead of the first content.

Figure 1:
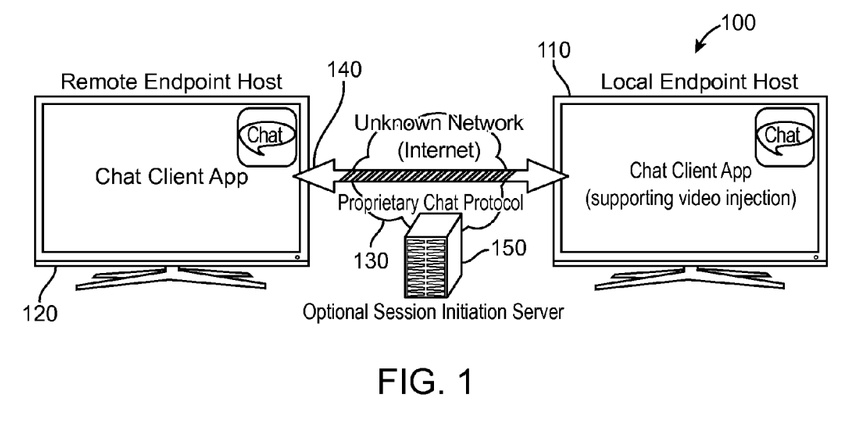
FIG. 1 shows a schematic view of a communications system, according to an embodiment.

FIG. 1 is a schematic view of a communications system in accordance with one embodiment. Communications system 100 may include a communications device that initiates an outgoing communications operation (local endpoint host device 110) and communications network 130, which local endpoint host device 110 may use to initiate and conduct video communications operations with other communications devices within communications network 130, for example using a video chat or video call protocol 140. For example, communications system 100 may include a remote endpoint host device 120 that receives the communications operation from the local endpoint host device 110. Although communications system 100 may include several local endpoint host devices 110 and remote endpoint host devices 120, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 130. Communications network 130 may be capable of providing communications using any suitable communications protocol. In some embodiments, communications network 130 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 130 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. local endpoint host device 110 and remote endpoint host device 120, when located within communications network 130, may communicate over a bidirectional communication path such as path 140. Both local endpoint host device 110 and remote endpoint host device 120 may be capable of initiating a communications operation and receiving an initiated communications operation.

In one embodiment, local endpoint host device 110 and remote endpoint host device 120 may include any suitable device for sending and receiving communications operations. For example, local endpoint host device 110 and remote endpoint host device 120 may include devices such as a television device, a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences). In one embodiment, an optional session initiating server 150 may be implemented for initiating a video chat or video call application on either local endpoint host device 110 or remote endpoint host device 110.

The remote endpoint host device 120 and local endpoint host device 110 may run a typical chat client (e.g., such as Skype, XMPP (Jabber), MSN, etc.) compatible with some embodiments that inject a video stream into a video chat or call channel during a session. The video communication between remote endpoint host device 120 and local endpoint host device 110 may provide access to the same video chat system and possessing compatible features are able to establish, through pre-existing means, a video-chat call where at least one of the local endpoint host device 110 or the remote endpoint host device 120 possesses and is able to stream video from an attached (or associated) camera device. The video-chat call, between these devices may be facilitated with the help of a session initiation or SIP server 150 and the connection between these devices travels through a network 130, such as the internet or a local LAN. The protocol used between these two devices may be proprietary and specific to the utilized video chat system.

Figure 2:
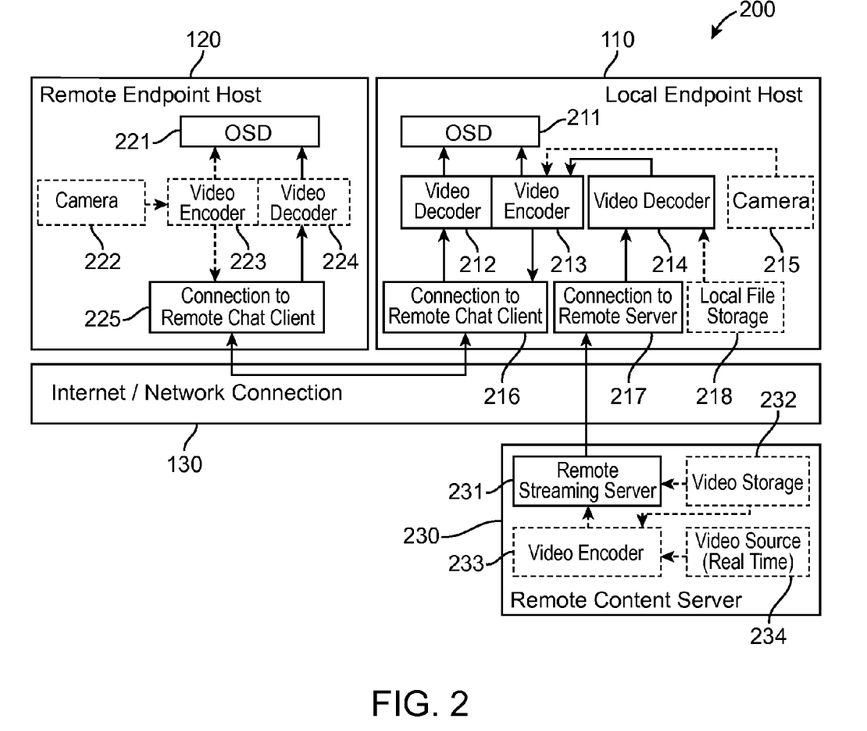
FIG. 2 shows a block diagram of an architecture system for video communication, according to an embodiment.

FIG. 2 shows a functional block diagram of an embodiment of an architecture system 200 for video communication by the remote endpoint host device 120 and local endpoint host device 110, according to an embodiment. In one embodiment, the system 200 comprises a local endpoint host device 110, remote endpoint host device 120, a remote server device 230 and network 130. In one embodiment, the local endpoint host device 110 comprises a display 211 (e.g., an on screen display (OSD)), a video decoder 212, a video encoder 213, a video decoder 214, a camera device 215 (which may be optional in one embodiment), a remote client connection module 216, a remote server connection module 217 and a local file storage module 218 (which may be optional in one embodiment).

In one embodiment, the remote endpoint host device 120 comprises a display 221 (e.g., an OSD, a camera device 222 (which may be optional in one embodiment), a video encoder 223, a video decoder 224 and a remote client connection module 225. In one embodiment, the remote server device 230 comprises a remote streaming server module 231, a video storage module 232, a video encoder 233 and a video source module 234.

In one embodiment, the displays 211 and 221 may each be a separate device from the local endpoint host device 110 and the remote endpoint host device 120, respectively, or integrated with the local endpoint host device 110 and the remote endpoint host device 120, respectively. In one embodiment, the network 130 may comprise a network interface, such as a network modem, router, etc. for handling communications between the local endpoint host device 110 and the remote endpoint host device 120 and for forming a local network that the local endpoint host device 110 and the remote endpoint host device 120 may be connected with.

In one embodiment, the local endpoint host device 110 has the ability to switch out-going video from the camera 215 to an external streaming server module 231 or file from the local file storage module 218 via the secondary video decoder 214. In one embodiment, the video encoder 213 encodes streaming video per the chat protocol specification employed. In one embodiment, the video encoder 213 has the ability to switch inputs from multiple sources, such as from the camera device 215 and from the video decoder 214 used to transcode streaming video from a source, such as the remote streaming server module 231, the local file storage module 218, or any other appropriate external source. In one embodiment, the video encoder 213 may multiplex video for local playback (if supported). In some embodiments, the video encoder 213 may directly provide transcoding features for video to directly encode streamed/file content for the outgoing video stream.

In one embodiment, the video decoder 212 processes video transmitted from the network 130 and for displaying video content locally on the display 211. In one embodiment, the video decoder 214 processes video content transmitted from the network 130 and for decoding video content to a format compatible with the outgoing encoder 213 for the video chat or call stream. In one embodiment, the camera device 215 may be optional. In one embodiment, the camera device 215 may be either a connected camera or a remote proxy.

In one embodiment, the remote client connection module 216 follows protocols specified by the specific chat system being used. In one embodiment, the remote client connection module 216 may either be supplied by the system or used via an external API. In one embodiment, the local file storage module 218 may be optional or required if the system 200 supports video injection from a local file source. In one embodiment, the local file storage module 218 supports the codecs of the supported video formats available to it. In one embodiment, the remote server connection module 217 represents a client of one or more supported services of streaming content available either from known providers (e.g., YOUTUBE®, HULU®), from specific streaming source protocols (e.g., RTSP, RTP, RTMP, HLS, etc), or from locally available video sources (e.g., Tuner, Video Input, etc.).

In one embodiment, the video encoder 223 encodes streaming video per the chat protocol specification, and may only be required if a camera 222 is present. In one embodiment, the video encoder 223 may multiplex the video for local playback if supported. In one embodiment, the video decoder 224 processes video transmitted from the network 130 and displays video content locally on the display 221. In one embodiment, the camera device 222 may be optional. In one embodiment, the camera device 222 may be either a connected camera or a remote proxy. In one embodiment, the remote client connection module 225 follows protocols specified by the specific chat system being used. In one embodiment, the remote client connection module 225 may either be supplied by the system or used via an external API.

In one embodiment, the remote streaming server module 231 provides functionality to serve and stream content via network or web services to clients on the Internet. In one embodiment, the video encoder 233 may be optional. In one embodiment, if the system 200 provides transcoding or encoding to specific formats, the video encoder 233 may be present for these purposes. In one embodiment, the video storage module 232 is optional. In one embodiment, the video storage module 232 may be present either to serve pre-encoded files or to feed files to a video encoder 233 for encoding, re-encoding or transcoding. In one embodiment, the video source module 234 may provide real-time video sources, such as webcams, video feeds (TV), queued content (program content), other live content, etc.

In one embodiment, both the local endpoint host device 110 and the remote endpoint host device 120 may include an input mechanism, communications circuitry, control circuitry, a global positioning system (GPS) receiver module, a microphone, audio output, and any other suitable components. In one embodiment, all of the applications employed by the displays 1211 and 221, the input mechanism, the audio output and communications circuitry may be interconnected and managed by control circuitry.

In one embodiment, the audio output may include any suitable audio component for providing audio to a user of the local endpoint host device 110 or the remote endpoint host device 120. For example, the audio output may include one or more speakers (e.g., mono or stereo speakers) built into the local endpoint host device 110 or the remote endpoint host device 120. In some embodiments, the audio output may include an audio component that is remotely coupled to the local endpoint host device 110 or the remote endpoint host device 120. For example, the audio output may include a headset, headphones or earbuds that may be coupled to a communications device with a wire (e.g., coupled to the local endpoint host device 110 or the remote endpoint host device 120 with a jack) or wirelessly (e.g., Bluetooth® headphones or a Bluetooth® headset).

In one embodiment, the displays 211/221 may include any suitable screen or projection system for providing a display visible to the user. For example, the display 211/221 may include a screen (e.g., an LCD screen) that is incorporated in the local endpoint host device 110 or the remote endpoint host device 120. As another example, the display 211/221 may include a movable display or a projecting system for providing a display of content on a surface remote from the local endpoint host device 110 or the remote endpoint host device 120 (e.g., a video projector). The display 211/221 may be operative to display content (e.g., information regarding communications operations or information regarding available media selections) under the direction of the control circuitry.

In one embodiment, the input mechanism may be any suitable mechanism or user interface for providing user inputs or instructions to the local endpoint host device 110 or the remote endpoint host device 120. The input mechanism may take a variety of forms, such as a button, keypad, dial, a click wheel, or a touch screen. The input mechanism may include a multi-touch screen. The input mechanism may include a user interface that may emulate a rotary phone or a multi-button keypad, which may be implemented on a touch screen or the combination of a click wheel or other user input device and a screen.

In one embodiment, the communications circuitry may be any suitable communications circuitry operative to connect to a communications network (e.g., network 130, FIG. 1) and to transmit communications operations and media from the local endpoint host device 110 or the remote endpoint host device 120. The communications circuitry may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quad-band, and other cellular protocols, VOIP, or any other suitable protocol.

In some embodiments, the communications circuitry may be operative to create a communications network using any suitable communications protocol. For example, the communications circuitry may create a short-range communications network using a short-range communications protocol to connect to other communications devices. For example, the communications circuitry may be operative to create a local communications network using the Bluetooth® protocol to couple the local endpoint host device 110 or the remote endpoint host device 120 with a Bluetooth® headset.

In one embodiment, the control circuitry may be operative to control the operations and performance of the local endpoint host device 110 or the remote endpoint host device 120. The control circuitry may include, for example, a processor, a bus (e.g., for sending instructions to the other components of the local endpoint host device 110 and the remote endpoint host device 120), memory, storage, or any other suitable component for controlling the operations of the local endpoint host device 110 or the remote endpoint host device 120. In some embodiments, a processor may drive the display 211/221 and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the local endpoint host device 110 or the remote endpoint host device 120 performs communications operations (e.g., saving contact information related to communications operations or storing information related to different media types and media items selected by the user).

In one embodiment, the control circuitry may be operative to perform the operations of one or more applications implemented on the local endpoint host device 110 and the remote endpoint host device 120. Any suitable number or type of applications may be implemented. Although the following discussion will enumerate different applications, it will be understood that some or all of the applications may be combined into one or more applications. For example, the local endpoint host device 110 and the remote endpoint host device 120 may include an application connection application, a video chat application, a video call application, a map application, a media application (e.g., QuickTime, MobileMusic.app, or MobileVideo.app). In some embodiments, the local endpoint host device 110 or the remote endpoint host device 120 may include one or several applications operative to perform communications operations. For example, the local endpoint host device 110 and the remote endpoint host device 120 may include a messaging application, a mail application, a telephone application, a voicemail application, an instant messaging application (e.g., for chatting), a videoconferencing application, a fax application, or any other suitable application for performing any suitable communications operation.

In some embodiments, the local endpoint host device 110 and the remote endpoint host device 120 may include a microphone. For example, the local endpoint host device 110 and the remote endpoint host device 120 may include a microphone to allow the user to transmit audio (e.g., voice audio) during a communications operation or as a means of establishing a communications operation or as an alternate to using a physical user interface. A microphone may be incorporated in the local endpoint host device 110 and the remote endpoint host device 120, or may be remotely coupled to the local endpoint host device 110 or the remote endpoint host device 120. For example, a microphone may be incorporated in wired headphones, or a microphone may be incorporated in a wireless headset.

In one embodiment, the local endpoint host device 110 and the remote endpoint host device 120 may include any other component suitable for performing a communications operation. For example, the local endpoint host device 110 and the remote endpoint host device 120 may include a power supply, ports or interfaces for coupling to a host device, a secondary input mechanism (e.g., an ON/OFF switch), or any other suitable component.

In one embodiment, a user may direct the local endpoint host device 110 or the remote endpoint host device 120 to perform a communications operation using any suitable approach. As one example, a user may receive a communications request from another device (e.g., an incoming telephone call, an incoming video chat session, a video call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, the local endpoint host device 110 or the remote endpoint host device 120 may comprise a mobile device that may utilize mobile device hardware functionality including: a GPS receiver module, a camera 215/222, a compass module, and an accelerometer and gyroscope module. A GPS receiver module may be used to identify a current location of the mobile device (i.e., user). The compass module is used to identify direction of the mobile device. The accelerometer and gyroscope module is used to identify tilt of the mobile device.

Figure 3:
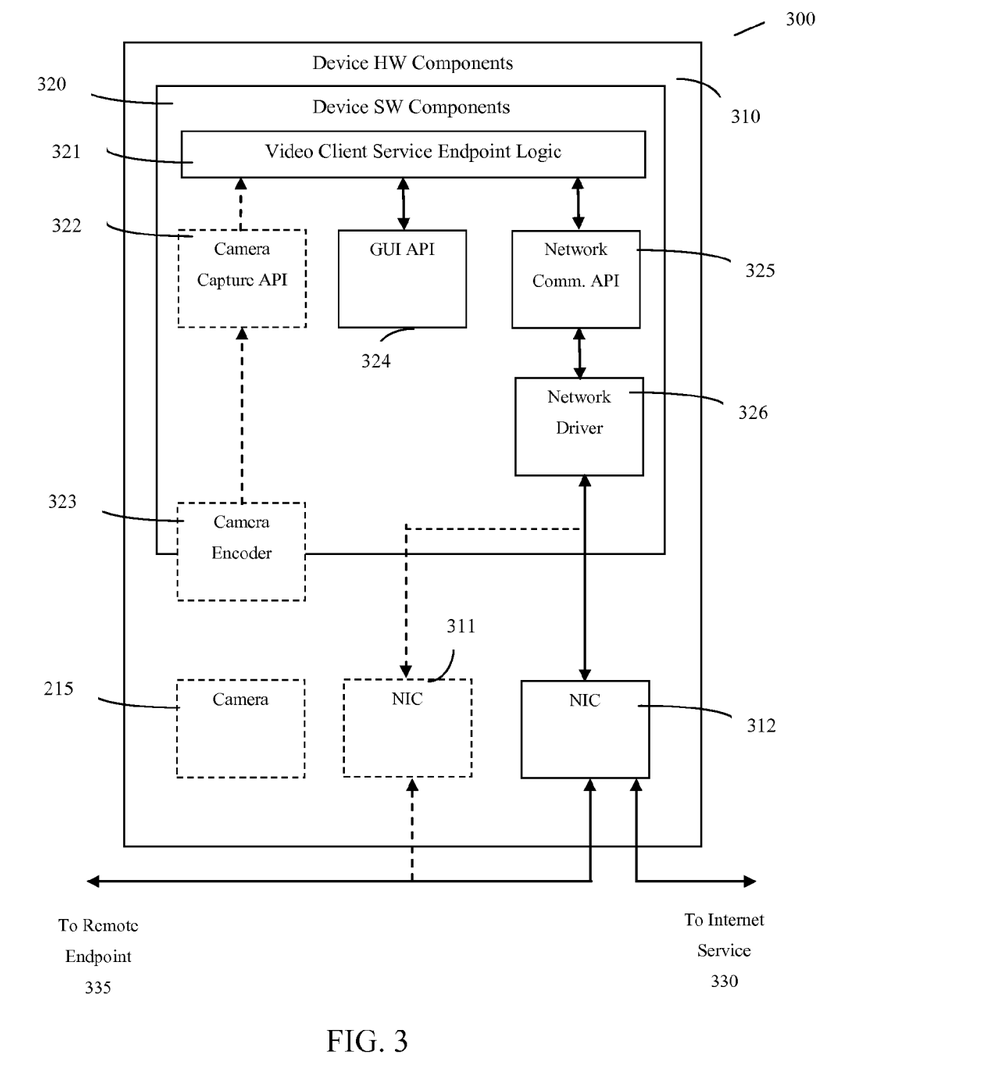
FIG. 3 shows an architecture for a local endpoint host, according to an embodiment.

FIG. 3 shows an architecture for a local endpoint host 300, according to an embodiment. In one embodiment, the local endpoint host 300 comprises a hardware (HW) portion 310 and a software (SW) portion 320. In one embodiment, the HW portion 310 comprises the camera 215 (optional) network interface (NIC) 311 (optional) and NIC 312 and a portion of the camera encoder 323 (optional). In one embodiment, the SW portion 320 comprises video client service endpoint logic 321, camera capture API 322 (optional), a graphical user interface (GUI) API 324, network communication API 325 and network driver 326. In one embodiment, the content flow (e.g., video and/or audio content, reference content (e.g., a link)) flows to the remote endpoint in the direction of the flow 335, and communication of external links, video and/or audio sources, etc. flow to a network service (e.g., Internet service) in the direction of flow 330. In one embodiment, if the camera 215 is not included in the local endpoint host 300, then the camera capture API 322, the camera encoder 323 and the NIC 311 are not included.

Figure 4:
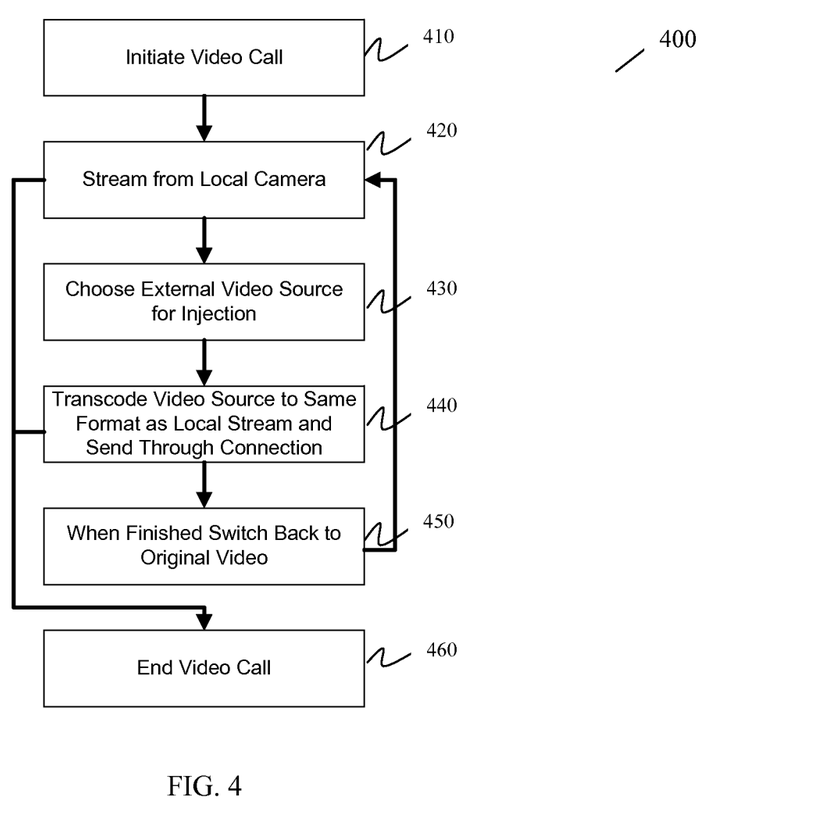
FIG. 4 shows an example flow chart for video communication, according to an embodiment.

FIG. 4 shows an example flow chart process 400 for video communication with video injection, according to an embodiment. In one embodiment, the process 400 starts with block 410 where a video call or video chat communication is initiated (e.g., using proprietary video chat or video calling service). In block 420, video content is encoded and streamed from a local camera (e.g., camera 211 or proxy) from a local endpoint host (e.g., local endpoint host device 110 or 300) to/from a remote endpoint host device (e.g., remote endpoint host device 120) for transmission over the network (e.g., network 130). In one embodiment, in block 430 an external video source is selected for injection into the video stream from the local endpoint host device to the remote endpoint host device (e.g., via a URL, URI, or file path selected from an interface, such as the GUI API 324).

In one embodiment, in block 440 the external video source that is selected is accessed and received from a source (e.g., the remote server device 230, the local file storage module 218, etc.) and encoded or transcoded (e.g., using the video decoder 214) to a same format as a format of the local video stream, and then sent through a remote client connection module (e.g., the remote client connection module 216) to the remote endpoint host device over a network (e.g., the network 130). In one embodiment, the external video source is injected into the same communication channel as the previous video stream and replaces the video stream with the content from the external video source.

In one embodiment, in block 450, when the external video source is either completed (e.g., the video ends), or the video is stopped (e.g., from the endpoint host device), the video stream is automatically switched back to the previous video stream content (e.g., the video stream from the video chat or video call protocol). In block 460, the video chat or video call ends (e.g., by either the local endpoint host device or the remote endpoint host device "hanging up" or ending the communication. In one embodiment, if the injected video source is communicated to the remote endpoint host device (e.g., playing or being shown on the remote endpoint host device), ending the video chat or video call will end the communication of the injected video.

Figure 5:
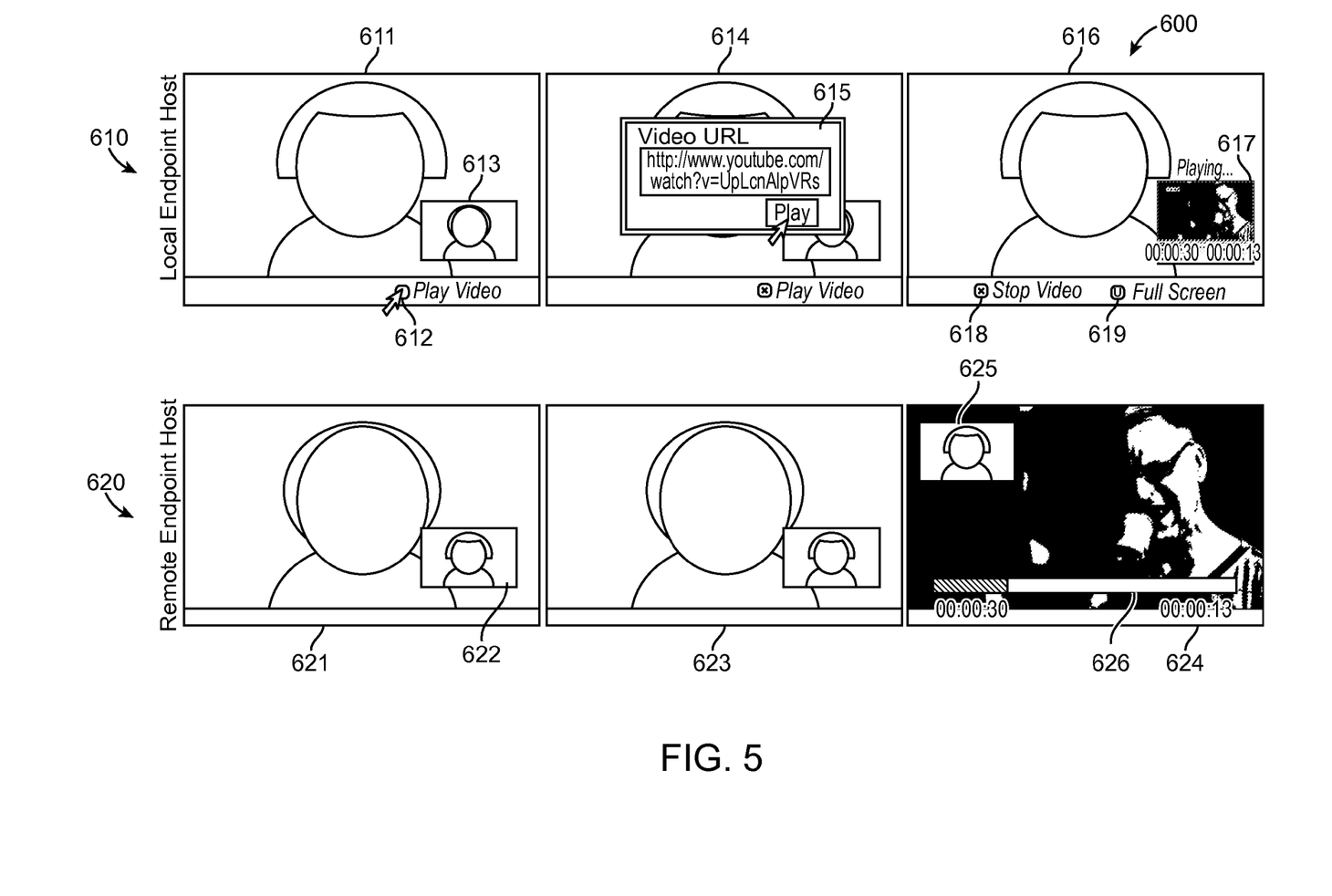
FIG. 5 shows an example scenario for video communication, according to an embodiment.

FIG. 5 shows an example scenario 600 for video communication with an injected video stream from an external source, according to an embodiment. In one embodiment, the video injection is bound by and limited to the lifecycle of a video-chat call. In one embodiment, both video streaming from a (local) camera device and from injected video does not happen simultaneously as the video channel is shared between the two. In one embodiment, the example scenario 600 shows the changes in user interaction via the local endpoint host device display (e.g., local endpoint host device 110 display 211) and the remote endpoint host device display (e.g., remote endpoint host device 120 display 221) upon injection of an external video source content.

In one embodiment, the local endpoint host device slides 610 are shown above the remote endpoint host device slides 620 and each represent what a user would see during a video chat or video call session. In one embodiment, in the first display views 611 and 621, the local and remote endpoint hosts see a video chat or video call scenario. In this example, each user may see the other on a display view 611 (on the local endpoint host device) and display view 621 (on the remote endpoint host device) and see a small window 613 (on the local endpoint host device) and 622 (on the remote endpoint host device) of "loopback" or local video. In one embodiment, on the display view 611, a video selection 612 (e.g., a button, icon, tab, etc.) is available for selecting a video source for injecting video from a source external to the video stream that currently is showing video of each user on the other users display views.

In one embodiment, in the video display view 614 a user of a local endpoint host device selected the video selection 612, which resulted in a video source display 615 being shown on the display view 614, which prompts a user for a video source selection. At the same time, in the display view 623, no change is seen. In one embodiment, using the source display 615, a user of the local endpoint host device may choose content for a video source (e.g., URL, URI, file path) for video to inject into the channel currently being used to display video on the display view 623 and small window 613. In one example, the user of the local endpoint host device selects a YOU-TUBE® video to play. In one embodiment, a user may provide a URL, URI or any other resource address or may be prompted with a (not shown) visual system to locate content.

In one embodiment, after the user of the local endpoint host device selects the content for video injection on the communication channel with the remote endpoint host device, the display view 616 shows the camera view of the user of the remote endpoint host device and the small window 617 shows the injected video being shown on the display view 624. On the display view 624, the injected video is being shown instead of the previous video content of the view from the local endpoint host device camera or proxy, while the small window 625 shows the feedback image from the local endpoint host device camera. In this example, the user of the remote endpoint host device no longer sees the video image from the local endpoint host device camera.

In one embodiment, a progress bar 626 (or other meta-data) regarding this injected video may be sent along to the remote user. In one embodiment, the display view 616 of the local endpoint host device includes a stop video selection 618 and a full screen selection 619 (for showing the injected video displayed in the small window 617 in a full-screen mode. In one embodiment, once the injected video ends, the communication session ends, or the stop video selection 618 is selected, the injected video ceases to be displayed.

Figure 6:
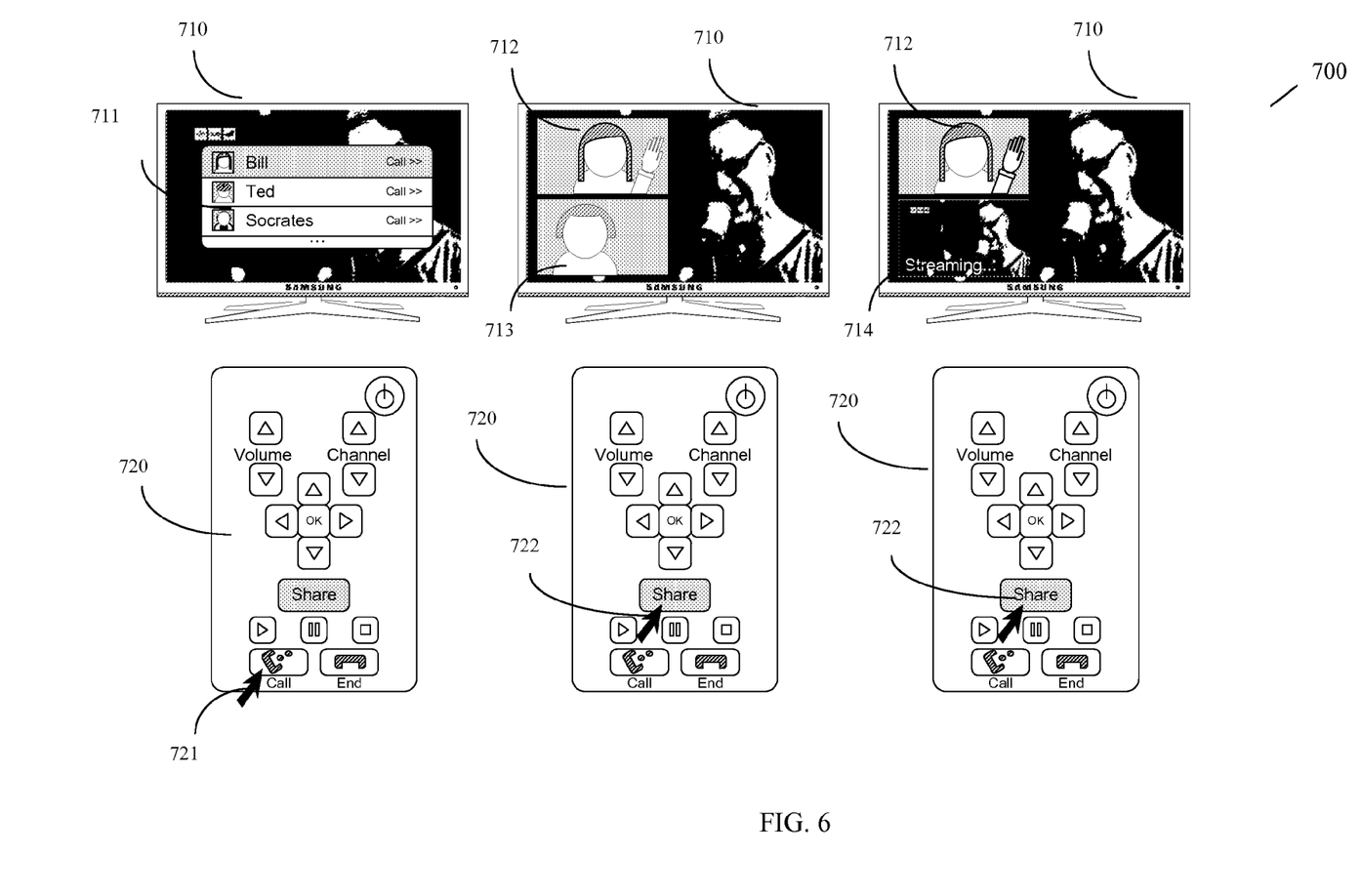
FIG. 6 shows another example scenario for video communication, according to an embodiment.

FIG. 6 shows an example scenario 700 for video communication with an injected video stream from an external source, according to an embodiment. In one implementation, video injection may be accomplished using a television device 710 using a remote control device 720 for input selections. In one embodiment, the example scenario 700 shows the use of the remote control 720 from the perspective of the local endpoint host device. In the example scenario 700, a user is watching video content on the display of the television device 710.

In one embodiment, the remote control 720 is used to initiate a video call with a press of button 721. Based on the button 721 selection a listing of contacts 711 is shown on the display of the television device 710. In one embodiment, based on the contact selection, a video call is made and the video view 712 shows the camera video stream from the remote endpoint host device while the video view 713 shows the camera video stream from the local endpoint host device (i.e., the television device 710). That is, as the video call begins, both users may see one another on their respective devices.

In one example, the user of the television device 710 selects the button 722 on the remote control 720 for sharing or indicating a desire to share the active video image content that is currently being displayed on the television device 710. In one embodiment, the active video image content may be either currently playing or otherwise selected via an external system. In one embodiment, after the system accesses the video content desired for sharing from the selected source, the accessed video is transcoded or re-encoded for streaming over the video chat call, replacing the original local feed. In one embodiment, on the television 710 display the video view 712 still shows the local camera stream on the display, and the video view 714 shows the view of the remote device display, which is now streaming the selected video content chosen for sharing. In one embodiment, at this point, streaming from the remote source is bound either by the length of the streamed content (if limited), by control of the local or (optionally) remote party.

Figure 7:
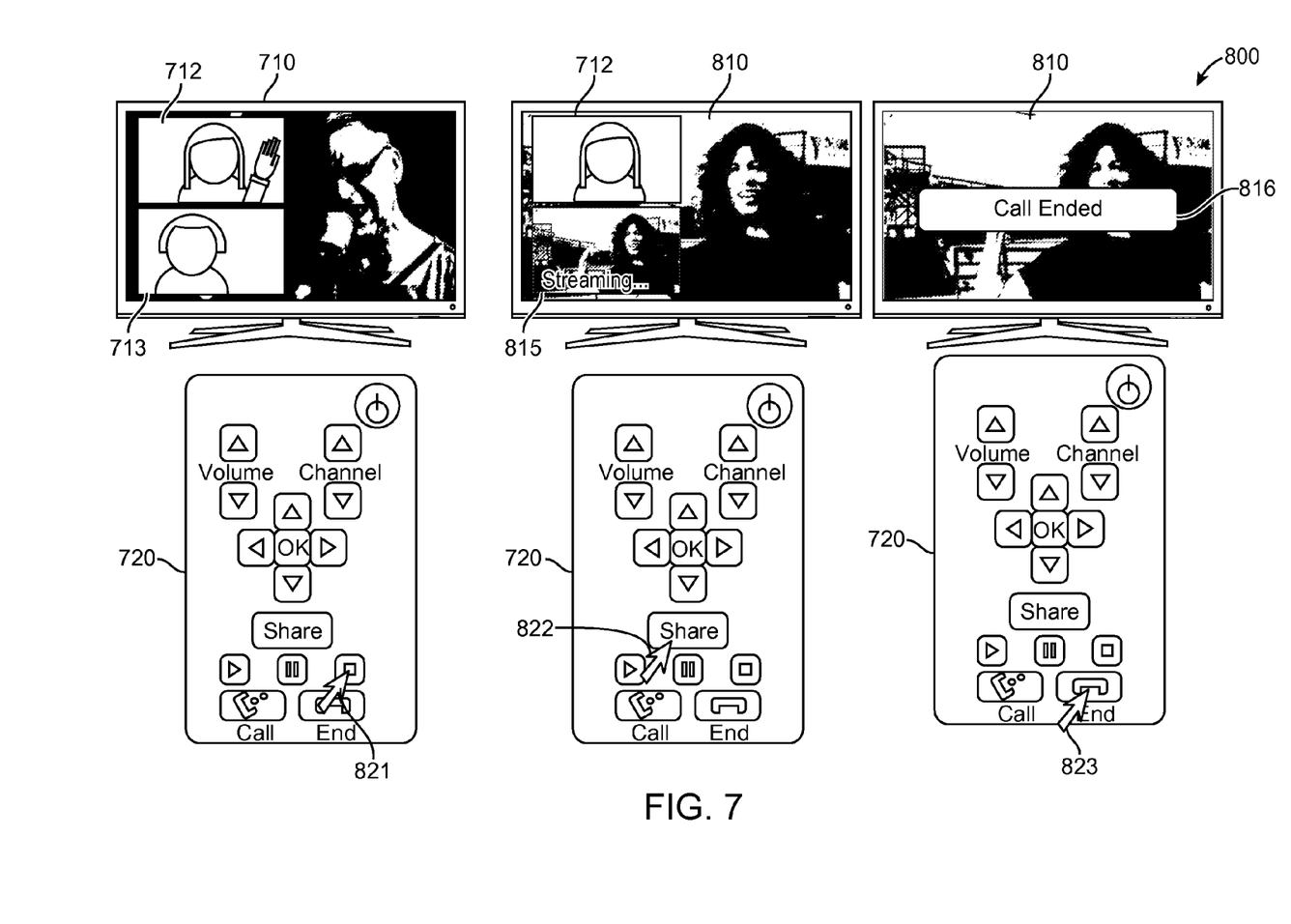
FIG. 7 shows an example scenario for video communication, according to an embodiment.

FIG. 7 shows an example scenario 800 for video communication with an injected video stream from an external source, according to an embodiment. In one embodiment, the example scenario 800 is a continuation of the scenario 700 shown in FIG. 6. In one embodiment, the user of the television device 710 uses the remote control 720 to select the stop button 821 for stopping the streaming video content selected for injection into the video call session with the remote device. In one embodiment, upon the selection of the stop button 821, the injected video ceases to be streamed and the video content previously streaming is shown on the image view 712 and 713 (e.g., the original local and remote camera feeds).

In one embodiment, the user of the television device 710 selects another video content to view, such as video stream 810 (e.g., channel change, DVR selection, selected video source, selected file, etc.). In one embodiment, the user now chooses to share the currently viewed video content 810 with a remote user of the video call. In one embodiment, the user of the television device 710 selects the share selection 822 on the remote control 720. The selected video content 810 is then streamed to the remote user's device and shown on the video image 815.

In one embodiment, once the user of the television device 710 selects to end the video call by selecting button 823 of the remote control 720, the local user terminates the video call, which also terminates the streaming of video 810 to the remote host. In one embodiment, at this point, all streaming between both devices has concluded and a message 816 is displayed on the display of the television device 710.

Figure 8:
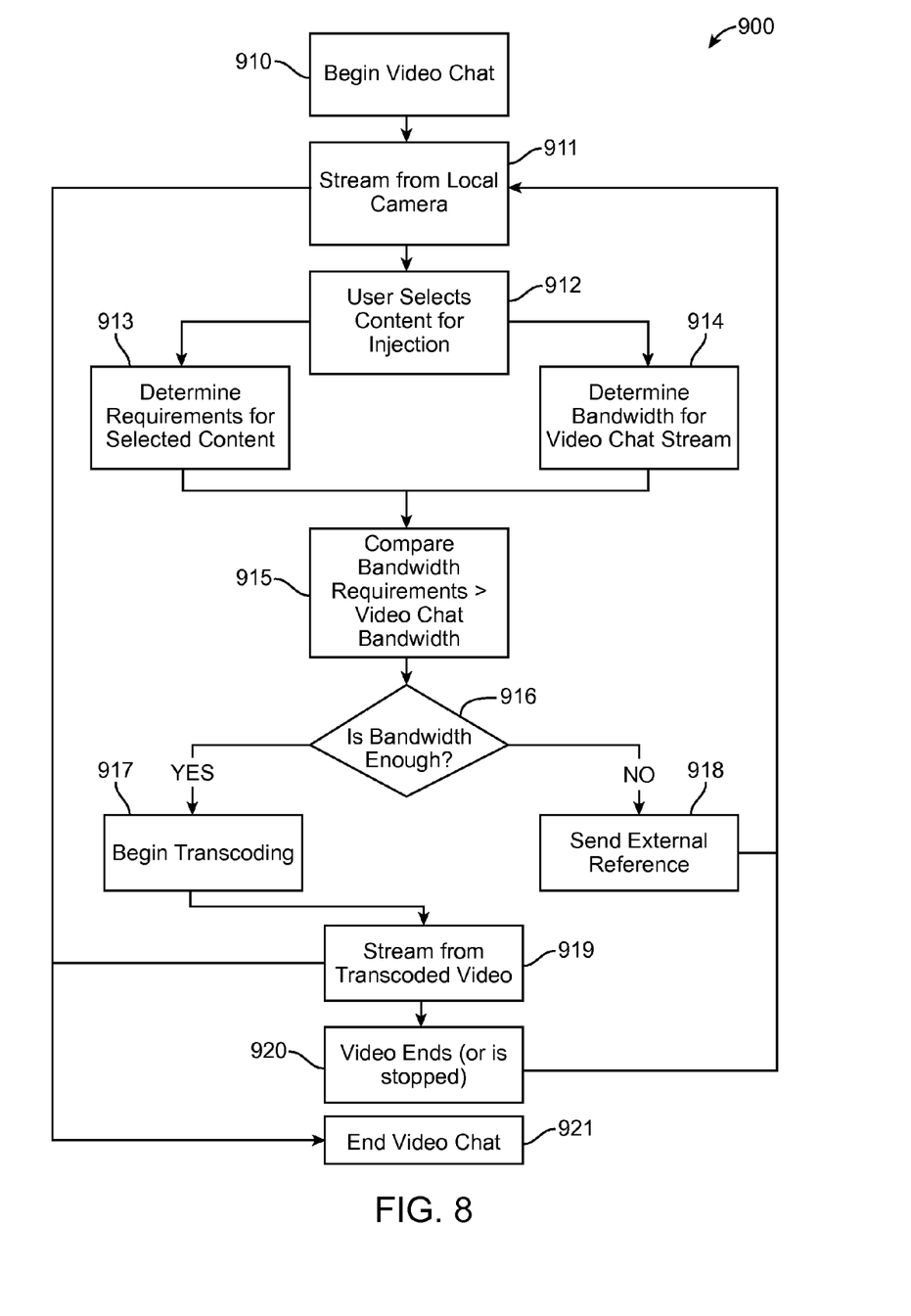
FIG. 8 shows an example flow chart for video communication bandwidth control, according to one embodiment.

FIG. 8 shows an example flow chart 900 for video communication bandwidth control, according to an embodiment. In one embodiment, in block 910 a video chat or video call session is initiated between a local endpoint host device (e.g., local endpoint host device 110 or 300) and a remote endpoint host device (e.g., remote endpoint host device 120). In one embodiment, in block 911 video content is streamed from a local camera of the local endpoint host device to the remote endpoint host device (e.g., showing users of each of the local and remote device to one another).

In one embodiment, in block 912 a user selects video content from a source for replacement of the current streaming video on the communication channel between the local and remote devices. In one embodiment, once the selected video content is selected, in block 913 the bandwidth requirement for the selected content is determined (e.g., the bandwidth rationalization or calculation is made at run-time when the video content is requested for injection). In one embodiment, in block 914 the bandwidth requirement for the streaming content from the local cameras (or proxies) is determined. In one embodiment, the bandwidth requirement determinations are due to many video chat protocols using adaptive streaming, and changing Internet bandwidth between devices.

In one embodiment, in block 915 the bandwidth requirements determined for the streaming video from the local cameras (or proxies) and that of the selected video content for injection are compared with one another using the bandwidth requirement of the original video content as a bandwidth threshold. In one embodiment, a determination is made in block 916 whether the current bandwidth for the original streaming content will be exceeded or not by the selected video content (for injection). In one embodiment, if it is determined that the bandwidth requirement for the selected video content (for injection) has a bandwidth requirement met by the threshold, the flow chart 900 continues to block 917, otherwise the flow chart 900 continues to block 918 where a reference for the selected video content is transmitted to the remote device.

In one embodiment, in block 919 the selected video content (for injection) is transcoded or re-encoded to match the format of the original streaming content, and the selected content is streamed to the remote device replacing the video content in the communication channel between the devices. In one embodiment, in block 920, when the selected video content ends or is stopped, the original video stream is continued from the local and remote devices (e.g., the streaming video from the local and remote cameras or proxies). In block 921, the video chat or video call session ends, which ends the video streaming of content between the local and remote devices.

Figure 9:
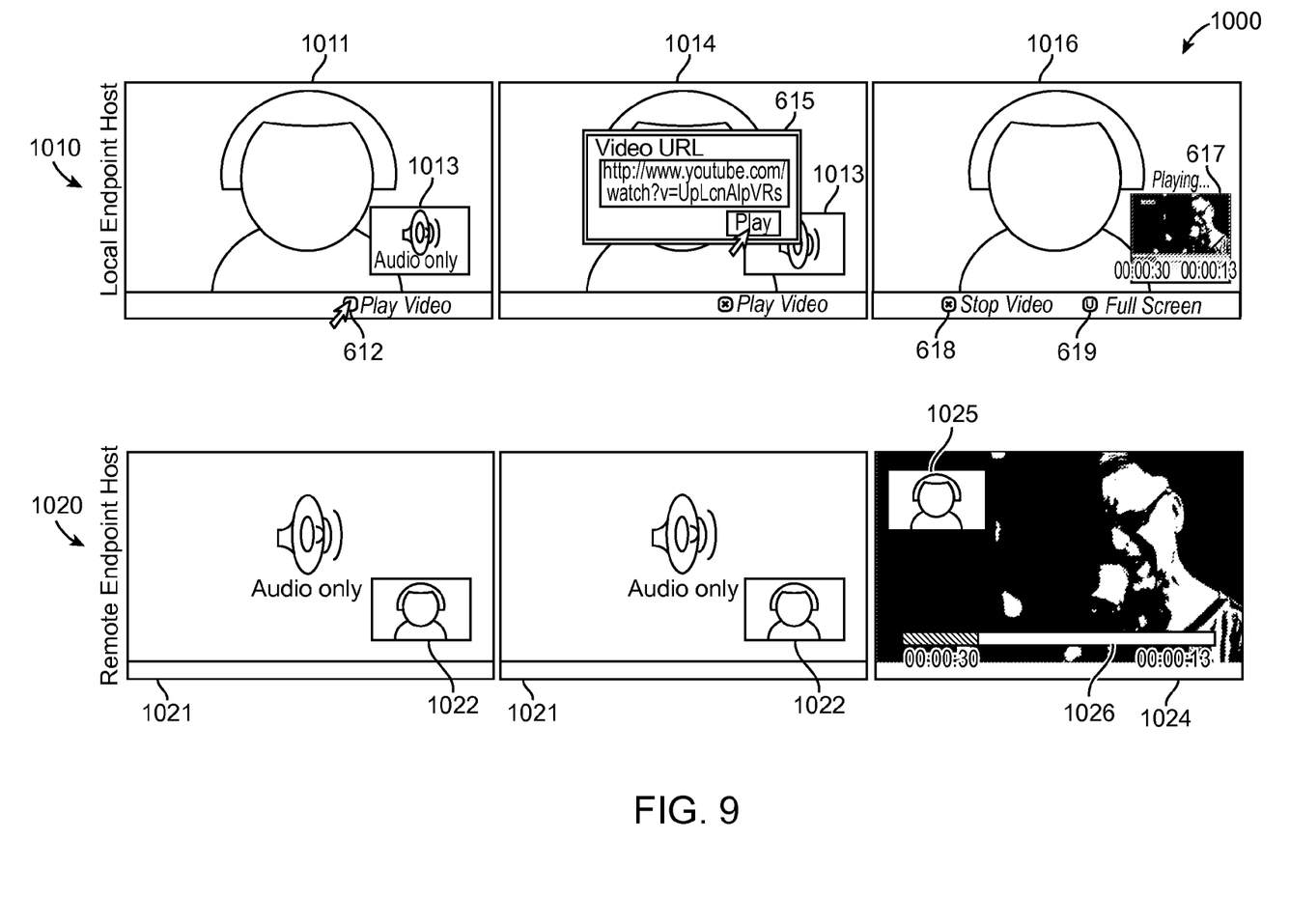
FIG. 9 shows another example scenario for video communication, according to an embodiment.

FIG. 9 shows another example scenario 1000 for video communication in a network, according to an embodiment. In one embodiment, the example scenario 1000 the local endpoint host device has entered a chat or call session that does not support video at the time of the chat or call session. In one embodiment, when a user requests injected video content, the communication channel is not currently streaming video content from the local camera (i.e., the communication channel is currently only available for audio content). In one embodiment, the example scenario 1000 shows the local endpoint host device slides 1010 above the remote endpoint host device slides 1020 and each represent what a user would see during a video chat or video call session.

In one embodiment, in the first display view 1011 and 1021, the local and remote endpoint hosts see a video chat or video call scenario where the communication channel only support audio content. In this example, the local user may see the remote user on the display view 1011 while the remote user cannot see the local user image on the display image 1021. In one embodiment, in the small window 1013, the local endpoint host device shows an image, icon, etc. informing the local user that only audio is available during the communication session. On the image display 1021, the remote user sees an image, icon, etc. informing them that the local user cannot be seen as the communication from the local user is audio only. In one embodiment, in the small window 1022, the remote endpoint host device shows the feedback of the remote device camera feed.

In one embodiment, the user of the local device desires to share video content with the remote user. In this embodiment, the local user selects the video selection 612 for selecting content for sharing (injection) during the communication session, which results in a video source display 615 being shown on the display view 1014 prompting the user for a content source selection. Upon the local user selecting to play the selected content for sharing with the remote user, the display image 1016 continues to show the camera or proxy feed from the remote device, while the small window 617 shows the selected video content being shown on the remote user's image display 1024. In one embodiment, the small window 1025 shows the feedback of the remote user's camera or proxy.

In one embodiment, a progress bar 1026 (or other metadata) regarding this injected video may be sent along to the remote user. In one embodiment, the display view 1016 of the local endpoint host device includes a stop video selection 618 and a full screen selection 619 (for showing the injected video displayed in the small window 617 in a full-screen mode. In one embodiment, once the injected video ends, the communication session ends, or the stop video selection 618 is selected, the injected video ceases to be displayed.

In one embodiment, when the communication from the local device is only available for audio content, video content streaming is first attempted to be initialized. If accomplished, video will be streamed to the remote device. If not, bandwidth requirements are considered to not be available and a reference or link to the requested content is sent to the remote device via an external channel. In one embodiment when the communication channel does not support audio/visual (A/V) content, an A/V channel is attempted to be initialized. If accomplished, video is streamed between the local and remote devices. If not, the bandwidth requirement is considered not to be met, and a reference or link is sent for the requested content to the remote device via an external channel.

In one embodiment, if the communication channel is available for audio and video, but video not used, the bandwidth requirement is considered supported for the requested video, which is streamed to the remote device. In one embodiment, if the communication channel is available for audio and video, but video not used, the bandwidth requirement is considered not supported. A link to the requested content is then sent to the remote device via an external channel.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for video communication, comprising:
   initiating video communication with a first electronic device;
   communicating a first content stream with the first electronic device through a communication channel;
   receiving, by a first decoder of the first electronic device, the first content stream for playing the first content stream on the first electronic device;
   selecting second content stream from a remote streaming video source external to the video communication;
   receiving, by a second decoder of the first electronic device, the second content stream over the Internet from the remote streaming video source;
   switching video communication using the second content stream;
   transmitting the second content stream to the first electronic device replacing the first content stream, wherein the second content stream is injected into the communication channel; and
   automatically switching video communication back to the first content stream through the communication channel based on at least one of stopping the second content stream or ending of the second content stream.

2. The method of claim 1, wherein a resource address for the second content stream is at least one of a uniform resource locator (URL), a uniform resource identifier (URI), a file path of a local system and a file path to a remote system.

3. The method of claim 1, further comprising:
   processing, by the second decoder, the second content stream for placing the second content stream in a same format as that of the first content stream.

4. The method of claim 3, wherein the video communication is a video call or a video chat session.

5. The method of claim 4, wherein the video communication comprises communicating between the first electronic device and a second electronic device.

6. The method of claim 5, further comprising:
   determining a bandwidth requirement for transmitting the second content stream; and
   transmitting a reference for the second content stream upon the determined bandwidth requirement exceeds a bandwidth threshold.

7. The method of claim 6, further comprising:
   transmitting the reference for the second content stream when communication with the first electronic device only supports audio communication, wherein the reference comprises a link for accessing the second content stream.

8. The method of claim 7, wherein the first content stream comprises at least one of: audio and video content, video content, or audio content.

9. The method of claim 8, wherein the second content stream comprises at least one of: audio and video content, video content, or audio content.

10. The method of claim 1, wherein the first electronic device and the second electronic device comprise one of a television device, a computing device and a mobile computing device.

11. A system for video communication, comprising:
    an encoder to encode one of a first content stream and a second content stream to provide video communication with a first electronic device;
    a first decoder to decode the first content stream;
    a second decoder to decode the second content stream; and
    an interface to select the second content stream from a remote streaming video source external to the video communication, wherein the interface is configured to switch video communication to the first electronic device by being configured to request transmission of the second content stream over the Internet and replacing transmission of the first content stream in a same communication channel, and to automatically switch video communication back to the first content stream in the same communication channel based on at least one of stoppage of the second content stream or ending of the second content stream, wherein the second content stream is injected into the same communication channel.

12. The system of claim 11, wherein a resource address for the second content stream comprises at least one of a uniform resource locator (URL), a uniform resource identifier (URI), a file path of a local system of a second electronic device and a file path to a remote system.

13. The system of claim 12, wherein the second decoder transforms the second content stream to a same format as that of the first content stream.

14. The system of claim 13, wherein the video communication comprises at least one of a video call and a video chat session, and the source external to the video communication is a streaming video server.

15. The system of claim 14, further comprising a network communication interface configured to determine a bandwidth requirement to transmit the second content stream to the first electronic device and to transmit a reference for the second content stream based on the bandwidth requirement exceeding a bandwidth threshold.

16. The system of claim 15, wherein the network communication interface is configured to transmit the reference for the second content stream upon a determination that communication with the first electronic device only supports audio, the reference comprises a link for accessing the second content stream, the first content stream comprises at least one of: audio content and video content, video content, and audio content, and the second content stream comprises at least one of: audio content and video content, video content, and audio content.

17. The system of claim 16, wherein the first electronic device and the second electronic device comprise one of a television device, a computing device and a mobile computing device.

18. A non-transitory computer-readable medium having instructions which when executed on a computer perform a method comprising:
   initiating video communication with a first electronic device;
   communicating a first content stream with the first electronic device through a communication channel;
   receiving, by a first decoder of the first electronic device, the first content stream for playing the first content stream on the first electronic device;
   selecting second content stream from a remote streaming video source external to the video communication;
   receiving, by a second decoder of the first electronic device, the second content stream over the Internet from the remote streaming video source;
   switching video communication using the second content stream;
   transmitting the second content stream to the first electronic device replacing the first content stream, wherein the second content stream is injected into the communication channel; and
   automatically switching video communication back to the first content stream through the communication channel based on at least one of stopping the second content stream or ending of the second content stream.

19. The medium of claim 18, wherein a resource address for the second content stream comprises at least one of a uniform resource locator (URL), a uniform resource identifier (URI), a file path of a local system and a file path to a remote system.

20. The medium of claim 19, wherein the method of the instructions further comprises:
   processing, by the second decoder of the first electronic device, the second content stream for placing the second content stream in a same format as that of the first content stream.

21. The medium of claim 20, wherein the video communication comprises at least one of a video call and a video chat session, and the video communication comprises communicating between the first electronic device and a second electronic device.

22. The medium of claim 21, wherein the method of the instructions further comprises:
   determining a bandwidth requirement for transmitting the second content stream; and
   transmitting a reference for the second content stream upon the determined bandwidth requirement exceeding a bandwidth threshold.

23. The medium of claim 22, wherein the method of the instructions further comprises:
   transmitting the reference for the second content stream when communication with the first electronic device only supports audio communication, wherein the reference comprises a link for accessing the second content stream.

24. The medium of claim 23, wherein the first content stream comprises at least one of: audio and video content, video content, or audio content, and the second content stream comprises at least one of: audio and video content, video content, or audio content.

25. The medium of claim 24, wherein the first electronic device and the second electronic device comprise one of a television device, a computing device and a mobile computing device.

* * * * *